Figure 1:
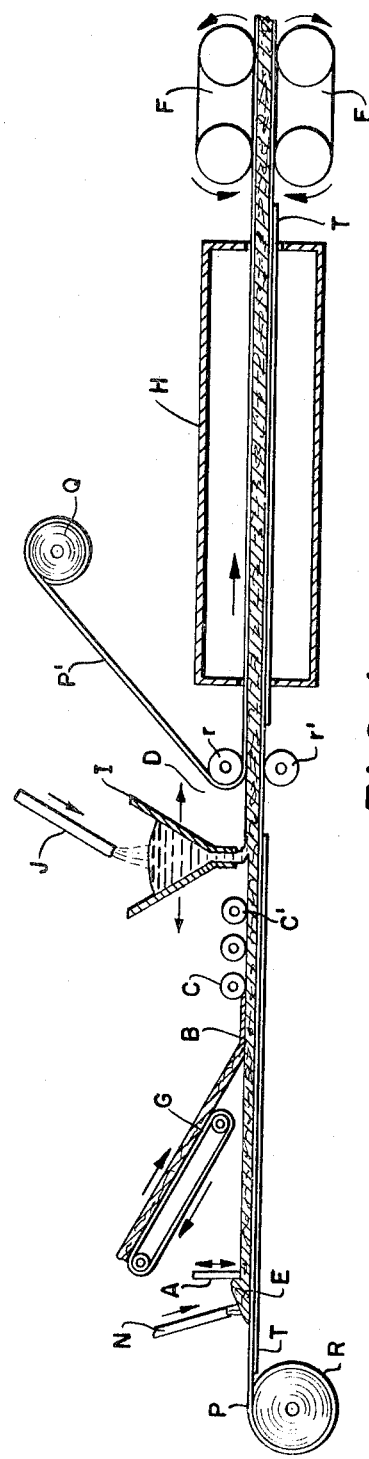

United States Patent

Simon

[15] 3,639,202
[45] Feb. 1, 1972

[54] COMPLEX PRODUCTS OF RESIN AND MINERAL FIBER AND PROCESS FOR MAKING SAID PRODUCTS

[72] Inventor: Albert Simon, Mont-Saint-Aignan, France
[73] Assignee: Compagnie de Saint-Gobain, Neuilly sur Seine, Seine, France
[22] Filed: June 20, 1966
[21] Appl. No.: 558,981

[30] Foreign Application Priority Data

July 2, 1965 France ....................................23260

[52] U.S. Cl..........................161/158, 117/123 D, 117/140 A, 156/62.2, 156/243, 156/247, 156/276, 156/323, 161/162, 161/166, 161/170, 161/43
[51] Int. Cl. ......................................B32b 5/14, B32b 17/04
[58] Field of Search......................161/43, 60, 70, 72, 78, 79, 161/82–84, 87, 88, 93, 140–144, 151, 158, 162, 166, 170, 194–196, 214, DIG. 4; 156/39, 62.2, 276, 323, 243, 247; 117/140 R, 123 D

[56] References Cited

UNITED STATES PATENTS

| | | |
|---|---|---|
| 2,688,580 | 9/1954 | Fingerhut............................161/195 X |
| 2,697,677 | 12/1954 | Elmendorf............................161/151 |
| 2,894,621 | 7/1959 | Ambrose............................156/323 X |
| 3,109,763 | 11/1963 | Finger................................161/170 X |
| 3,316,139 | 4/1967 | Alford et al.........................161/162 X |
| 3,385,749 | 5/1968 | Hampshire..........................161/166 X |

FOREIGN PATENTS OR APPLICATIONS 721,718 11/1965 Canada..................................161/151

OTHER PUBLICATIONS

Morgan, P. (Editor), Glass Reinforced Plastics, ILIFFE & Sons Ltd., London (1957) pp. 122– 123
Morgan, P. (Editor), Glass Reinforced Plastics, ILIFFE Books Ltd., London (1961) pp. 182– 183

*Primary Examiner*—Robert F. Burnett
*Assistant Examiner*—Raymond O. Linker, Jr.
*Attorney*—Dale A. Bauer, John L. Seymour and Bauer and Seymour

[57] ABSTRACT

Rigid panels are made by pressing a layer of mineral fibers into a loaded stratum of hardenable resin, pressing another loaded stratum of hardenable resin into the mineral fiber stratum of the first pressing, the constitution or quantity of the third stratum differing from that of the first to provide equal mechanical properties at both faces of the sheet. The stratified sheet is then hardened and has density of load (particulate filler) increasing from the center toward the surfaces of the sheet. The sheet is preferably produced between outer pellicles of organic plastic, e.g. cellulosic, which can be removed before use. Such sheets serve as roofing and wall paneling and may be corrugated or otherwise shaped during manufacture.

17 Claims, 2 Drawing Figures

PATENTED FEB 1 1972

3,639,202

INVENTOR
Albert Simon

BY Bauer and Seymour
ATTORNEYS

COMPLEX PRODUCTS OF RESIN AND MINERAL FIBER AND PROCESS FOR MAKING SAID PRODUCTS

The present invention relates to a process of, and apparatus for the production of complex products of resin and mineral fiber. It is known to combine mineral products, for example in the form of powder, with thermosetting resin, in order to form a composite material having excellent mechanical strength because of the mineral component.

Such mixtures are commonly prepared in an apparatus of the Werner type, followed by molding under pressure to impart the desired form or shape to the completed article. The selection of mineral powders and their proportions in the mixture are made in accordance with the desired mechanical qualities of the finished product.

Moreover, it is equally well known to produce in a continuous manner, a stratified product of pure resin and a mat of glass fibers. The resulting product is translucent or semiopaque, and may be colored, corrugated or planar, and useful for many purposes.

As an example of one way of carrying the present process into practice, a layer of catalyzed polyester resin liquid is deposited upon a thin sheet or film of cellulosic material, to a certain uniform thickness. After this, a mat or layer of glass fibers is spread on and over the resin. The operation may be continuous, as by drawing the film at constant rate from a roll thereof, to and over a table or platform, while applying the resin in a layer of uniform thickness onto and over the exposed surface of the moving film or pellicle, following which a layer of glass fibers is deposited onto and over the resin. The speed of the film and the rate of distribution of resin and fibers thereover are properly correlated so that layers of resin and fibers are deposited in a continuous manner while the film is moved at constant velocity.

As soon as the mat of glass fibers has been deposited, the fibers penetrate into the resin and become coated therewith. This operation may be assisted by the application of pressure by rollers or longitudinal filaments applied to the mat, or by other means which assure that the fibers have penetrated into the resin and that entrained air has been expelled.

Following the step described in the preceding paragraph, a second layer of resin is applied over the mat, after which a second pellicle or film is applied to and over the second layer of resin. This second film may have a width such that it extends from edge to edge of the first film and overlaps the edges thereof. The overlapping edges may be secured together by adhesive to form a complete enclosure or sack for the glass-resin complex, substantially from the instant of its formation. The sack or enclosure with its contained glass-resin components is then immediately passed to a drying chamber or oven where the resin is hardened and the ingredients united to form a plate or sheet which may be planar, corrugated or in other desired shape or form. After trimming the sack along the edges of the sheet and removing the cellulosic film, the final product is obtained in the form of slabs, sheets, and the like.

In the example described in the preceding paragraphs it is possible to replace the pure resin with a resin and mineral powder mix wherein the powder acts as a filler. In such a case the resulting product is opaque but has additional desirable properties such as increased compressive strength.

The present invention has for a principal object the provision of a process and apparatus by which the percentage of filler varies from the surface to the central or median layer of the completed product. That is to say, it is a purpose to form a product wherein the density of filler is a maximum in the surface layers and decreases gradually and symmetrically to a minimum at the central or median layer.

It is an object to provide a process and product which affords a completed resin-fiber complex having a texture which varies uniformly from the central or median plane or layer, outwardly in both directions to the respective surface layers.

Ancillary to the foregoing object it is a further object to provide a sheet which, by reason of the construction described, is free from warping and which, after completion, maintains its desired form.

Still another object is to provide a plastic-fiber sheet which by reason of adequate fiber distribution in the median layer and layers adjacent thereto, possesses excellent mechanical strength while at the same time has surface layers which because of increased proportion of resin or resin mix therein, are relatively dense and resistant to wear and abrasion.

Another object is to provide a sheet of resin-filler mineral fiber composition wherein the surface layers may be given a desired density and hardness by reason of corresponding variation of the proportions of pulverulent filler material, with respect to resin, without materially affecting the mechanical strength of the finished sheet.

The manner and means by which the foregoing and other objects and advantages are attained will be clear to those skilled in the art, after a study of the following detailed description in connection with the accompanying drawing.

Figure 2:
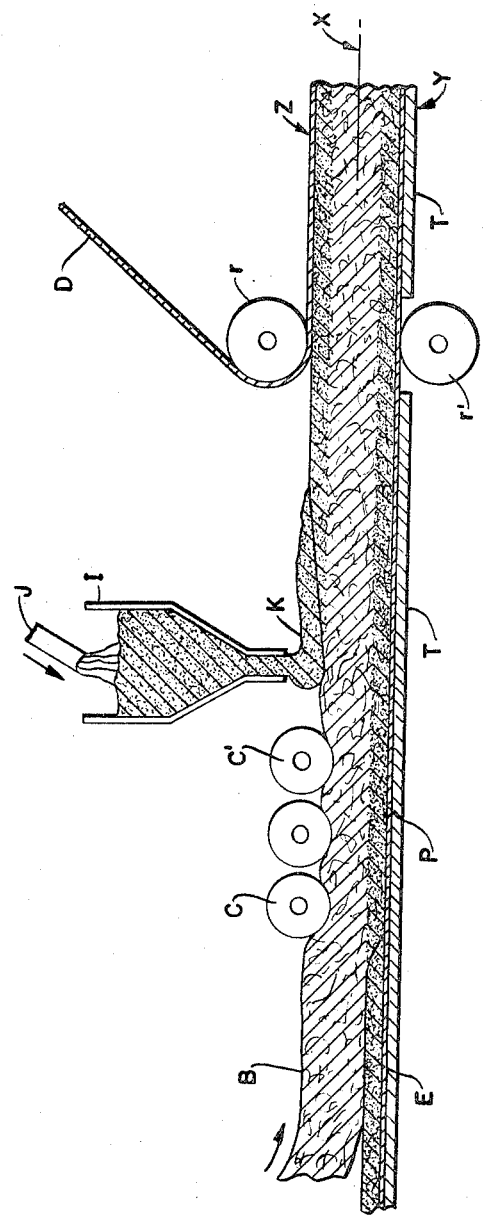

In the drawing:

FIG. 1 is a generally schematic elevational view of the apparatus for carrying out the process; and FIG. 2 is a schematic view to an enlarged scale of a portion of FIG. 1, and showing in greater detail the means for impregnating the mineral fiber mat with resin to achieve the stated objects.

At R, FIG. 1, is indicated a roller from which there is drawn a pellicle P which, as previously stated, may be of thin cellulose. The pellicle is drawn over a work support or table T by means of drawing rollers or belts F shown at the right of the figure. As the pellicle passes station E on table T there is applied thereto, by means for example, of a series of laterally spaced nozzles in side-by-side relation and one of which is shown at N, a covering or layer of a catalyzed liquid resin having uniformly dispersed therein a suspension of mineral particles. This first layer is smoothed to uniform predetermined thickness, as by passing beneath a vertically disposed, vertically adjustable screed plate A fixed immediately downstream of nozzles or applicators N. In conformity with the invention the amount of resin-powder mix screeded at A corresponds to more than half of the total amount present in the completed product, per unit area thereof. Merely as an example, this first distribution of resin-powder mix may comprise about 60 percent of the total deposited upon the pellicle per unit area.

At B an endlesss belt conveyor G inclined downwardly and forwardly and driven by suitable mechanism not shown, applies a uniformly distributed mat of mineral fibers, for example, a felting comprising glass fibers cut into short lengths, onto the resin-powder mix. The speed of conveyor G is adjusted with respect to the rate of travel of pellicle P so that the distribution is regular and of uniform thickness over the entire area of the resin mix. Usually the speeds of the mat and of the pellicle are the same.

The pellicle P with its load of resin and fibers, passes next to and beneath means generally indicated at C, C' and shown as a series of presser rollers, by which the mat is forced into the resin mix. The resulting composition consists at this point, of a mixture of resin-powder-fibers wherein the proportion of filler increases gradually from the surface of pellicle P, upwardly. Items C, C' may be fluted rollers, longitudinally disposed wires or filaments, or other suitable known means for forcing the fibers into the resin wax.

Immediately after passing C, C' the remainder, say 40 percent of the total resin mix, is applied from a hopper I which tapers to a narrow slot or opening extending transversely across the pellicle and is supplied with the resin mix from conduit J. The orifice of the hopper is so located that, as the mat emerges from between rollers C, C' and progressively expands, it immediately receives the remaining resin mix. Thereby the undesired entrainment of air into the mat is avoided.

The remainder of the resin mix applied at I is forced into the semiimpregnated mat at D. At this station there are a pair of superposed rollers $r$, $r'$. Roller $r'$ is a backing roller and contacts and supports pellicle P and the material thereon as the pellicle passes over a transverse slot or break in table T. A second film or pellicle P' and which may be of the same material as pellicle P, is drawn from a supply roll Q and passes downwardly and rearwardly to and beneath upper roller r. Thereby a second or top pellicle is continuously applied over the composite sheet or ribbon. This second pellicle has a transverse dimension and is so applied by known means, that its edges overlap and are secured as by adhesive to the edges of pellicle P. The two thus form in effect, a sack completely enclosing the composite sheet.

The sack and its enclosed material passes at constant speed to and within a drying chamber which may be supplied with heating means not shown. In this chamber any desired shape such as corrugations may be formed into the sheet. Thereafter the complex is set by the polymerization or the resin due to the catalyst or hardener mixed therein. After curing, the completed product emerges from chamber H and is drawn forwardly by and between the belts F.

If the completed mineral fiber-resin-filler complex obtained by the described double, nonuniform impregnation, is examined, it will be found that, for example, where the 60 percent lower–40 percent upper procedure has been followed, the pulverulent filler is distributed substantially symmetrically with respect to the median plane of the product. In view of the symmetry the product has no tendency to warp or bend. This symmetry of distribution is shown in FIG. 2 to the right of rollers r, r' where, referring to a median plane X parallel with and midway between pellicles P, P', there is, at and adjacent this plane a minimum percentage of filler, which percentage increases gradually in each direction from the median plane outwardly to both surfaces of the sheet. That is to say, the upper and lower halves of a section through the sheet, taken in a plane normal to the plane of the figure and to table T, are alike in having nonuniform distribution of pulverulent filler.

If, as in prior art procedures, all of the resin-filler mix were laid down at A, below the glass fiber mat, there would be an unsymmetrical distribution of filler with respect to the median plane of the sheet. Actually, because of its downward movement the mat has the effect of progressively separating and passing through the resin, gathering filler and concentrating it below the mat, forcing a major proportion of it adjacent the side or face in contact with the lower pellicle, leaving a minimum concentration of filler adjacent the surface which is in contact with pellicle P'. Still referring to prior art procedure, after polymerization has fixed the differences in concentration within the opposite sides of the median plane, the resulting sheet warps or bends. Furthermore, the mechanical qualities of the sheet such as strength, are different on the one face than on the other because the reinforcing action of the filler is much less on the one face than on the other.

Due to the requirement in the present invention that entrained air be expelled from the mat as it passes station C, C', the mat is there forced into the resin mix so that a portion of the mix passes upwardly through the mat to the upper surface of the complex. For this reason the resin mix is applied at I at a lesser time-rate than at N, in order that the final product may vary uniformly in composition from the central or median plane outwardly to each surface of the completed product.

The invention thus consists essentially in impregnating the mat with different quantities per unit area, on the two faces thereof, and which are so selected that the finished product has a composition which, as previously explained, varies uniformly from the median plane to each superficial or surface layer. Because of this uniformity the product has the same mechanical properties at each surface thereof and is devoid of any tendency to warp. In a particularly advantageous way of carrying the invention into practice, the mat is impregnated on one side with a certain quantity or mass per unit area of resin-filler mix, and on the other side with a lesser quantity or mass per unit area of the same mix. The two quantities are so proportioned that the final product has the symmetry previously described.

The percentages of resin mix applied at A and I may vary in accordance with the size of the grains of the charge and the texture of the mineral fibers. These percentages may vary, for example, from 60 to 90 percent of the whole, applied at A, and from 40 to 10 percent for that applied at I. The relative proportions will be selected in accordance with the granulometry of the powder, its nature and concentration in the resin mix, and the concentration of fibers, in order to produce a sheet that does not warp after polymerization and shrinkage.

The invention may be employed to produce industrial and commercial products in the form of plates or sheets, planar, corrugated or in various other cross-sectional shapes and forms and which, irrespective of form, have a construction wherein the concentration of filler decreases from the two faces of the sheet inwardly to the central or median layer or stratum.

In particular it is possible with this invention, to produce sheets having diverse strata composed of fillers of different nature and/or of different concentrations. As one example, the product had a weight of 2,200 g./m.$^2$ and contained 300 g./m.$^2$ of glass fiber, or 13.65 percent of the total, with a thickness of from 1.2 to 1.7 mm., according to the concentration and nature of the filler in the resin.

Samples have shown that with constant weight and percentage of glass fiber, increasing the percentage of filler in the resin results in a corresponding increase in mechanical resistance of the completed product. The percentage of filler may be increased to a maximum compatible with proper impregnation of the mat by the resin mix and release of gas therefrom; but increase of the filler beyond a certain limit results in a sharp drop in mechanical resistance or toughness.

Applicant has found that with a percentage just short of that previously noted, that is, with the maximum permissible percentage of filler or powder in the resin, due to the role played by the mat as a filter, the exterior or superficial layers of the product are enriched in filler with respect to the central layer or stratum, so that the product thus obtained has better mechanical resistance.

The invention therefore especially envisages a procedure according to which the resin-filler mix introduced at stations A and I contains the maximum permissible percentage of filler compatible with the fluidity necessary for proper impregnation of the interposed mineral fibers or mat. It also envisages a product which, because of the process previously disclosed, has a percentage of filler diminishing from the superficial layers or faces, inwardly toward the central or median layer, so that the percentage of filler in the superficial layers is the maximum compatible with the required fluidity of the mix and a resulting correct impregnation of the mat.

As an example, a product was obtained using a mixture of 100 parts of polyester resin with 50 percent styrene, and 150 parts of dolomite passing a 200 screen. This mixture was used in accordance with the disclosed process, to impregnate a fiber mat of glass fibers about 5 cm. in length and weighing about 400 to 450 g./m.$^2$. After calendering there was obtained a product 1.55 mm. thick which was shaped into sinusoidal profile 177×51 and 76×18. After polymerization the product was cut into plates and had a resistance equal to that required by the French standard P 38.301. The numbers represent the length and height of the undulations of the sinusoidal profile in centimeters. The standard P 38.301 is a publication of the French government devoted to engineering standards, of which pages 5 and 6 are pertinent to this subject.

Calcium carbonate, dolomite, powdered slate, powdered asbestos, calcined alumina, silica, etc., alone or in mixture, may be used as filler material to be introduced into the resin.

It is understood that the foregoing disclosure is by way of a nonlimiting example and that various changes and alterations are possible. It is also understood that the inventive process may be carried out in such a way that the percentage of filler in the resin may be different as between the two faces, that is, as applied at stations A and I. These percentages will be so selected that there is obtained a completed product which is essentially symmetrical from the median plane of the product, outwardly in each direction to the surface layers.

The words "layer," "layers," "stratum" and "strata" as used in the specification and claims, refers only to the material as deposited and do not refer to the completed product which, as previously explained, consists of a composite structure of resin-filler mix and mineral fibers whose relative proportions vary substantially uniformly from a maximum of fiber at the median plane, to a minimum at the superficial layers, the variation being gradual and progressive from the median plane outwardly in both directions to the surfaces of the sheet or plate. Thus the finished sheet whether planar, corrugated or of other cross-sectional form, has adequate mechanical strength because of the fibers thereof, while its superficial layers are dense and possess optimum resistance to abrasion and wear. Further, since the texture varies uniformly from the median plane to each surface, the completed sheet has no tendency to warp or depart from its finished shape.

Having fully disclosed the invention, what I claim and desire to secure by U.S. Letters Patent is:

1. The process of forming a hard, stratified sheet loaded with mineral filler which comprises depositing a mix of hardenable resin and mineral filler to form a first stratum, depositing on said first stratum a second stratum of mineral fibers, pressing the mineral fibers into the first stratum, depositing upon said second stratum a mix of hardenable resin and mineral filler to form a third stratum, pressing the third stratum into the mineral fiber stratum, the resin strata differing from each other in quantity to produce, under the pressure applied during formation, a maximum density of filler near the surfaces of the sheet, a minimum at the center thereof, and a symmetrical distribution of filler and mechanical properties on opposite sides of the fibrous interlayer, and hardening the stratified sheet.

2. The process of claim 1, said process being carried out continuously, continuously drawing a first ribbon of pellicle over and across a supporting surface, depositing said first, second and third strata onto the first pellicle while traversing the supporting surface, and continuously applying a second ribbon of pellicle to and over said third stratum while traversing the supporting surface, the second pressing being applied to the stratified sheet through the pellicles.

3. The process of claim 2, exerting first compression transversely of the strata after deposit of said second stratum, to intermingle the mineral fiber and resin mix at their interface, and exerting a second linear compression transversely of the strata after deposit of said third stratum to intermingle the resin mix of said third stratum with the mineral fibers at their interface, said second compression being exerted by and between upper and lower rollers, and applying the second pellicle by passing the same to and about the upper of said rollers.

4. The process of claim 1, the resin mix of said first and third strata containing thermohardening resin in fluid state and containing a hardener before deposit as aforesaid, the process being completed by heating the thermohardening resin strata to hardening temperature.

5. In the process of claim 1, varying the relative percentages of resin and pulverulent filler mix deposited in said first and third strata, per unit area of sheet, to form a sheet whose completed composition increases in filler density from the median layer of the sheet, outwardly in both directions to the respective superficial layers thereof.

6. The process of claim 1, said first stratum being deposited upon a first pellicle on a supporting surface, subsequently overlaying said third stratum with a second pellicle and, prior to hardening, binding together the edges of said first and second pellicles to form a sack enclosing all said strata.

7. The process of claim 6, trimming the edges of the completed sheet and pellicles, after hardening, and removing the pellicles.

8. In the process of claim 1, the proportions of plastic and pulverulent filler in the mix comprising said first and third strata being the same, and varying the mass of the mix of said first stratum per unit area, with respect to the mass of the mix of said third stratum per unit area, in the proportions of about 60 to 90 percent for said first stratum, to about 40 to 10 percent for said third stratum, to effect a finished sheet varying uniformly in fiber-plastic mix ratios, from the median plane of the sheet outwardly in each direction to the respective surfaces thereof.

9. In the process of claim 1, said second stratum comprising a mat of glass fibers, and subsequently to the deposit of said second stratum but before deposit of said third stratum, applying pressure to intermingle said mat and resin mix comprising said first stratum.

10. The process of claim 9, and subsequently to deposit of said third stratum and before hardening, applying pressure to the superposed three strata to intermingle the plastic mix of said third stratum with the glass fiber stratum at their interface.

11. The process of claim 1 wherein the first stratum is formed by a plastic-filler mixture and the third stratum is formed by a smaller quantity of the same mixture, the ratio between the quantities applied to form each stratum being such that the substantially symmetrical distribution of the filler is obtained.

12. The process of forming a sheet of plastic bonded, mineral fiber complex which comprises depositing a first layer of a mix of liquid thermosetting resin and pulverulent filler, laying a mat of mineral fibers over said layer, exerting compression over said mat to force the mix into the mat of fibers and to expel air from said mat, freeing said mat from compression and applying a second layer of a mix of liquid thermosetting resin and pulverulent filler over said mat, the amount of filler per unit area of mat in said first layer of mix being greater than the amount in said second layer of mix in order to obtain a substantially symmetrical distribution of the filler on both sides of the sheet.

13. The process of claim 12 wherein the proportions of liquid thermosetting resin and of pulverulent filler in said first and second layers of mix are the same, a greater amount per unit area of mat being used to form said first layer than to form said second layer.

14. The process of claim 12 wherein the proportion of pulverulent filler in the mix used to form said first layer is greater than the proportion of pulverulent filler in the mix used to form said second layer.

15. A layered article of manufacture having outer, pellicular layers and a hardened resinous interlayer containing mineral fibers and finely divided mineral filler in which the particles of mineral filler are arranged in progressing density decreasing toward the center.

16. A layered article of manufacture according to claim 15 in which the resinous interlayer is of thermally hardened resin, the mineral fibers embedded in the resin are mainly, centrally located between the pellicular layers, and the particles of mineral filler are mainly concentrated in proximity to the pellicular layers.

17. An article of manufacture in the form of slabs, sheets and the like having a unitary body comprised of hardened resin of thermosetting type, a mat or layer of glass fibers impregnated by the resin and concentrated in a region centrally located between the surfaces of the body, and mineral filler in powder form concentrated adjacent the surfaces of the body, the concentration of mineral filler decreasing toward the center of the body.

* * * * *